US011126671B2

(12) United States Patent
Miller et al.

(10) Patent No.: US 11,126,671 B2
(45) Date of Patent: Sep. 21, 2021

(54) SERIALIZING PLUG-IN DATA IN A WEB PAGE

(71) Applicant: Microsoft Technology Licensing, LLC, Redmond, WA (US)

(72) Inventors: Patrick Miller, Sammamish, WA (US); John Nguyen, Redmond, WA (US); Manish Garg, Redmond, WA (US); Chakkaradeep Chinnakonda Chandran, Sammamish, WA (US); Daniel Kogan, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 844 days.

(21) Appl. No.: 15/637,010

(22) Filed: Jun. 29, 2017

(65) Prior Publication Data
US 2018/0052940 A1 Feb. 22, 2018

Related U.S. Application Data

(60) Provisional application No. 62/375,896, filed on Aug. 16, 2016.

(51) Int. Cl.
*G06F 16/951* (2019.01)
*G06F 16/25* (2019.01)
(Continued)

(52) U.S. Cl.
CPC .......... *G06F 16/951* (2019.01); *G06F 3/0481* (2013.01); *G06F 3/04842* (2013.01);
(Continued)

(58) Field of Classification Search
CPC .... G06F 16/951; G06F 16/958; G06F 16/986; G06F 16/258; G06F 40/103;
(Continued)

(56) References Cited

U.S. PATENT DOCUMENTS 7,594,003 B2   9/2009   Davidson et al.
7,814,410 B2   10/2010  Kothari et al.
(Continued)

OTHER PUBLICATIONS

"Non Final Office Action Issued in U.S. Appl. No. 15/622,986", dated Jan. 28, 2019, 13 Pages.
(Continued)

*Primary Examiner* — Matthew Ell
*Assistant Examiner* — Lahcen Ennaji
(74) *Attorney, Agent, or Firm* — Liang IP, PLLC

(57) ABSTRACT

Computer systems, devices, and associated methods of serializing a web page that is of a first format and includes a plug-in including properties of a second format are disclosed herein. In one embodiment, a method includes identifying, in a manifest for the plug-in, properties for inclusion in the first format in a serialized web page. The manifest may also include metadata associated with the properties in the list of properties. The method includes formatting the properties, including associated property values and metadata, in the first format and adding the formatted properties to the serialized web page. The plug-in properties not included in the manifest can be added to the serialized web page in the second format.

20 Claims, 11 Drawing Sheets

(51) Int. Cl.

| | |
|---|---|
| *G06F 16/958* | (2019.01) |
| *H04L 29/08* | (2006.01) |
| *G06F 3/0484* | (2013.01) |
| *G06F 3/0481* | (2013.01) |
| *G06F 40/103* | (2020.01) |
| *G06F 8/41* | (2018.01) |
| *G06F 8/71* | (2018.01) |
| *G06F 9/445* | (2018.01) |
| *G06F 8/70* | (2018.01) |
| *G06F 8/60* | (2018.01) |
| *G06F 8/65* | (2018.01) |
| *G06F 8/61* | (2018.01) |

(52) U.S. Cl.
CPC .......... *G06F 16/258* (2019.01); *G06F 16/958* (2019.01); *G06F 16/986* (2019.01); *G06F 40/103* (2020.01); *H04L 67/22* (2013.01); *G06F 8/433* (2013.01); *G06F 8/60* (2013.01); *G06F 8/61* (2013.01); *G06F 8/65* (2013.01); *G06F 8/70* (2013.01); *G06F 8/71* (2013.01); *G06F 9/44505* (2013.01); *G06F 9/44521* (2013.01); *G06F 9/44536* (2013.01); *G06F 9/44552* (2013.01); *H04L 67/1097* (2013.01)

(58) Field of Classification Search
CPC .... G06F 3/0481; G06F 3/04842; G06F 8/433; G06F 8/60; G06F 8/61; G06F 8/65; G06F 8/70; G06F 8/71; G06F 9/44505; G06F 9/44521; G06F 9/44536; G06F 9/44552; H04L 67/22; H04L 67/1097
See application file for complete search history.

(56) References Cited

U.S. PATENT DOCUMENTS

| | | |
|---|---|---|
| 7,836,303 B2 | 11/2010 | Levy et al. |
| 7,890,487 B1 | 2/2011 | Hess et al. |
| 7,984,115 B2 | 7/2011 | Tien et al. |
| 8,010,890 B2 | 8/2011 | Gumz et al. |
| 8,682,672 B1 | 3/2014 | Ha et al. |
| 8,972,856 B2 | 3/2015 | Channabasavaiah |
| 9,092,538 B2 | 7/2015 | Katz et al. |
| 9,195,477 B1 | 11/2015 | Spencer |
| 9,282,137 B2 | 3/2016 | Seshadri et al. |
| 9,325,806 B2 | 4/2016 | Bapst et al. |
| 9,331,957 B2 | 5/2016 | Kaplinger et al. |
| 2005/0050461 A1 | 3/2005 | Hall et al. |
| 2006/0167981 A1 | 7/2006 | Bansod et al. |
| 2006/0248166 A1 | 11/2006 | Milosevic et al. |
| 2007/0245310 A1 | 10/2007 | Rosenstein et al. |
| 2008/0059238 A1* | 3/2008 | Park ............... G06F 19/321 705/3 |
| 2008/0183593 A1 | 7/2008 | Dierks |
| 2012/0101907 A1 | 4/2012 | Dodda |
| 2013/0067459 A1 | 3/2013 | Sannidhanam et al. |
| 2013/0318148 A1* | 11/2013 | Atamel ............ G06F 16/958 709/203 |
| 2014/0173414 A1* | 6/2014 | Chan ............... G06F 40/143 715/234 |
| 2014/0189498 A1 | 7/2014 | Liverant et al. |
| 2014/0258063 A1* | 9/2014 | Chourasia .......... G06Q 30/0201 705/35 |
| 2015/0120821 A1 | 4/2015 | Bendell |
| 2015/0373034 A1 | 12/2015 | Seshadri et al. |
| 2016/0055277 A1 | 2/2016 | Lahav et al. |
| 2016/0110313 A1* | 4/2016 | Prakash ............ G06F 40/197 715/202 |
| 2016/0140626 A1 | 5/2016 | Agarwal et al. |
| 2017/0090734 A1* | 3/2017 | Fitzpatrick ............ G06F 40/106 |
| 2017/0337168 A1* | 11/2017 | Kunze ..................... H04L 67/42 |
| 2018/0052809 A1 | 2/2018 | Nguyen et al. |
| 2018/0052811 A1 | 2/2018 | Gonzalez del solar et al. |

OTHER PUBLICATIONS

Zartner, et al., "Using the application cache", Published on: May 30, 2014 Available at: https://developer.mozilla.org/en-US/docs/Web/HTML/Using_the_application_cache.

"Non Final Office Action Issued in U.S. Appl. No. 15/633,548", dated Jul. 30, 2019, 47 Pages.

Burtoft, Jeff, "Understanding the Manifest for Web App", Retrieved From : https://thishereweb.com/understanding-the-manifest-for-web-app-3f6cd2b853d6, Feb. 16, 2015, 5 Pages.

* cited by examiner

```
{
164 ─ annotation: "Safety practices",
       authorName: "John Doe",
       chartitem: "",
       endrange: "",
       excelSettingsType: "",
       file: "Document.docx",
       listId: "36ae7dce-84c9-4e7d-9029-16f87c1e3348",
       modifiedBy: "2013-11-21T16:23:09-08:00",
       photoUrl: "https://privatecdn.sharepointonline.com/msft.spoppe.com/_userprofile/
    userphoto.jpg?_eat_=1495478260_e32ed312f9a487e009581bccbd72fd995dd59cec66f8db04406624f9
    3ca92e8e&_oat_=1495478260_6955ccfcd916881d0a4d5205331ae1721768eaabc479e8d6341a24c5f4dd1
    585&size=S&accountname=johndoe%40microsoft.com",
       rangeitem: "",
168 ─ serverRelativeUrl: "/personal/johndoe_microsoft_com/Documents/Document.docx",
       siteId: "57395c08-b306-4453-8b8c-5800a5cbe345",
       startrange: "",
       tableitem: "",
170 ─ title: null,
       uniqueId: "556dafc6-9e69-4ffa-87a1-f2642e2d4f5a",
       wdallowinteractivity: true,
       wdhidegridlines: true,
       wdhideheaders: true,
       wdslideindex: 1,
171 ─ wdstarton: 1,
       webId: "7d032cde-e442-4f73-a733-2cfdcdafff02",
       wopiurl: "https://msft-my.spoppe.com/personal/johndoe_microsoft_com/_layouts/15/
    WopiFrame.aspx?sourcedoc={556dafc6-9e69-4ffa-87a1-
    f2642e2d4f5a}&action=interactivepreview"
}
```

*FIG. 3*

```
<div>
    <div
        data-sp-canvascontrol=""
        data-sp-canvasdataversion="1.0"
        data-sp-
controldata="{"controlType":4,"id":"273d20d5-8271-
4121-be07-
bed7728d92ee","position":{"zoneIndex":1,"sectio
nIndex":1,"controlIndex":1},"editorType":"C
KEditor","addedFromPersistedData":true}"
        >
        <div
            <h3>Homebuilder's Inc. Company Portal</h3>
        </div>
        <div
            data-sp-rte=""
            >
            <p>This is your portal to accessing everything you'll need to know while
working here at Homebuilder's Inc.  You can find all sorts of answers and useful advice.
Before we get into the details, please review the following safety document.</p>
        </div>
    </div>
    <div
        data-sp-canvascontrol=""
        data-sp-canvasdataversion="1.0"
        data-sp-
controldata="{"controlType":3,"webPartId":"b7dd04e1-
19ce-4b24-9132-b60a1c2b910d","id":"7d357a4d-22f8-47c4-9a6e-
1196062f21e1","position":{"zoneIndex":2,"sectio
nIndex":1,"controlIndex":1},"addedFromPersistedData"
:true}"
        >
        <div
            data-sp-webpart=""
            data-sp-webpartdataversion="1.0"
            data-sp-webpartdata="[content of Figure 5B]"
            >
            <div
                data-sp-componentid=""
                >b7dd04e1-19ce-4b24-9132-b60a1c2b910d</div>
            <div
                data-sp-htmlproperties=""
                >
                <div
                    data-sp-prop-name="annotation"
                    data-sp-searchableplaintext="true"
                    >Safety practices</div>
                <a
                    data-sp-prop-name="serverRelativeUrl"
                    href="/personal/johndoe_microsoft_com/Documents/Document.docx"
                    ></a>
            </div>
        </div>
    </div>
</div>
```

*FIG. 5A*

```
{
    id: "b7dd04e1-19ce-4b24-9132-b60a1c2b910d",
    instanceId: "7d357a4d-22f8-47c4-9a6e-1196062f21e1",
    title: "Safety Document",
    description: "Shows Office document embedded on the page",
    dataVersion: "1.0",
    properties: {
        authorName: "John Doe",
        chartitem: "",
        endrange: "",
        excelSettingsType: "",
        file: "Document.docx",
        listId: "36ae7dce-84c9-4e7d-9029-16f87c1e3348",
        modifiedBy: "2013-11-21T16:23:09-08:00",
        photoUrl: "https://privatecdn.sharepointonline.com/msft.spoppe.com/_userprofile/userphoto.jpg?_eat_=14d1585&size=S&accountname=johndoe%40microsoft.com",
        rangeitem: "",
        siteId: "57395c08-b306-4453-8b8c-5800a5cbe345",
        startrange: "",
        tableitem: "",
        title: null,
        uniqueId: "556dafc6-9e69-4ffa-87a1-f2642e2d4f5a",
        wdallowinteractivity: true,
        wdhidegridlines: true,
        wdhideheaders: true,
        wdslideindex: 1,
        wdstarton: 1,
        webId: "7d032cde-e442-4f73-a733-2cfdcdafff02",
        wopiurl: "https://msft-my.spoppe.com/personal/johndoe_microsoft_com/_layouts/15/WopiFrame.aspx?sourcedoc={556dafc6-9e69-4ffa-87a1-f2642e2d4f5a}&action=interactivepreview"
    }
}
```

*FIG. 5B*

SERIALIZING PLUG-IN DATA IN A WEB PAGE

CROSS-REFERENCE TO RELATED APPLICATIONS

This Application is a Non-Provisional Application of and claims priority to U.S. Provisional Application No. 62/375,896, filed on Aug. 16, 2016, the disclosure of which is incorporated herein in its entirety.

BACKGROUND

A web page is a document that can be read by web browsers for displaying designed information to users. A web page can include text, pictures, videos, or other suitable content items. A web page can also include style sheets, scripts, or other types of metadata describing how various content items are to be displayed. Upon receiving a web page, web browsers can render and output the various content items of the web page in accordance with the associated style sheets, scripts, or other types of metadata. A web page can also include interactive elements such as links to other web pages. As such, when a user clicks on a link, the web browser can display another web page, start a video, play a sound, or perform other suitable actions.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A web site typically contains multiple web pages and associated content items hosted on one or more web servers of a web site owner. In certain implementations, web applications can be utilized to render web pages. For example, different web pages of the web site may be rendered by different web applications. The web site can also deploy scripts or plug-in units to the web application and having executables and associated library files in order to provide enhanced user experiences. For example, scripts or plug-in units can be executed upon request to dynamically retrieve updated information from external sources, query back-end databases based on user input, or perform other suitable actions.

Such an arrangement, however, presents a challenge when the web site is not hosted on web servers belonging to the web site owner but instead on those belonging to a hosting service. For example, a cloud service provider can provide servers, network storage devices, or other computing resources in a data center to host the web site according to a contract with the web site owner. The cloud service provider, however, has no control or even knowledge of any scripts or plug-in units deployed in the hosted web site and executed by a host web application. Thus, executing scripts or plug-in units on the servers of the cloud service provider can potentially cause damages to hardware/software components of the servers intentionally or accidentally.

Several embodiments of the disclosed technology can address at least some of the foregoing challenges by shifting execution of the web applications from the server side to the client side, e.g., on a client computing device. In one implementation, a developer can configure a web application by (i) defining various content items of the web page and associated rendering format and (ii) defining various functional components or "actions" of the web application using a TypeScript, JavaScript, or other suitable types of scripting or client-executable computer language. Based on the software implementations from the developer, a compiler can generate web packages for images, texts, or other suitable static content items. Such static content items can be stored and distributed in, for example, various content distribution network ("CDN") servers for ready retrieval. The compiler can also generate a manifest associated with the web application. The manifest can include definitions of a list of "actions" or modules of the web application. The modules can include software codes to render a web page object in a particular fashion, retrieve information from designated sources to be displayed on the web page, and periodically update the information to the web page, or perform other suitable functions.

A page model can then be created for the web application based on the static content items and the manifest. In certain embodiments, the page model can include a blank web page defined according to, for instance, hypertext markup language ("HTML"), extensible markup language ("XML"), or other suitable languages. The page model can also include a module loader and a list of script modules (or references thereto) corresponding to those in the manifest of the web application. The page model can then be saved or stored as an HTTP, XML, or other suitable types of file in a server of the cloud service provider hosting the web site.

Unlike in other web hosting schemes, upon request from a client device, the server provides the page model to the client device instead of a fully rendered web page. Upon receiving the page model from the server, the client device can render the blank web page in a web browser and initiate execution of the script modules. Execution of the script modules can cause the web browser to perform the designed actions and generate web page objects that serve as content for the blank web page. For example, one script module can be configured to display a business calendar for a web page of a business news portal. Thus, unlike in other web hosting systems, execution of web applications is performed on the client device with no risk to hardware/software components of the data center belonging to the cloud service provider.

Several embodiments of the disclosed technology are also directed to serializing for storage a web page that is authored at the client device by a user. The web page can be stored in a content management system ("CMS"), which can host a customizable database for storing web sites, document libraries, web pages, or other suitable types of content. As the author, the user can be an information worker who works directly within a web browser to compose text, graphics, and other objects, and design visual appearances of the web page. Unlike a graphic designer or developer, who use program codes such as HTML or JavaScript for building the web page, the user can add plug-ins to the web page, which can be created by third parties or the CMS.

After receiving the author's input, the web page can be saved by storing data representing the web page in the server. The CMS can provide various content management services for any saved web pages. For instance, the CMS can crawl the saved web page to develop a search index for a search engine. The search engine in turn can provide search results selected, for example, because a keyword included in the body of a web page matches a user query. The saved web pages can also be used for determining search relevance for other saved web pages, based on, for example, references by a saved web page to the other saved web pages. The CMS can also be configured to detect and remove malicious code in any saved web pages. The CMS can further be configured to fix broken links in any saved web page, such as when a linked web page is moved or renamed, and optimize rendering of the saved web pages.

Typically, web pages are stored in the CMS in a suitable format, e.g., HTML, that the CMS is configured to readily process for providing various content management services for the web pages. However, data for some objects in a web page may be formatted differently in a native form from the overall web page. For instance, a plug-in, added by a user to the web page, may comprise scripts that are formatted in an object notation format of a scripting language, such as JavaScript Object Notation ("JSON") format for use with JavaScript code. Accordingly, the data for the plug-in may be in a format that is different from what the CMS is configured to process.

Several embodiments of the disclosed technology can address at least some of the foregoing challenges via serializing a web page by incorporating data or metadata associated with the plug-in in the native format of the web page. The plug-in can maintain a set of properties and values for the properties. A manifest for the plug-in can include metadata that identify the properties whose values are to be serialized in the web page in the format of the web page. For example, metadata can identify a property type for a property value to be added to the serialized web page. When the web page is being saved, serialization is triggered to extract values for the properties included in the manifest and saved in the format of the serialized web page as a component of the web page. Values for the remaining properties of the plug-in, which are not converted to the format of the web page, can be incorporated in an original format in the serialized web page. The CMS can therefore process data associated with the plug-in, and can use the processed data to provide the various content management services to the saved web page. The serialized web page can also be de-serialized during rendering of the web page. Additionally, the deserialization process may not rely on a manifest used for serializing the web page. As such, serialized plug-in data may be de-serialized even when the plug-in data was written in an old version of the plug-in, whose manifest may not be available.

BRIEF DESCRIPTION OF THE DRAWINGS

FIG. 3 is a text file including example plug-in data in accordance with embodiments of the disclosed technology.

FIGS. 5A-5B show a text file including a serialized web page in accordance with embodiments of the disclosed technology.

DETAILED DESCRIPTION

Certain embodiments of systems, devices, components, modules, routines, data structures, and processes for serializing a web page of a data format that includes a plug-in written in a different data format are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1A-8.

As used herein, the term "serialization" generally refers to a process of translating data structures or object states to a format that can be stored and reconstructed later. For example, a web page, as authored by a user, can be serialized and stored in a server. In other words, data structures or object states of the web page can be converted from an initial format to a new format for storage or processing. The web page in the new format can subsequently be reconstructed to derive the original data structures or object states. As used herein, the term a "serialized web page" generally refers to a web page, or a portion thereof, that has been or is being serialized for storage. For example, a serialized web page may comprise HTML code defining an editing container in the web page. As used herein, the term "editing container" generally refers to a region, portion, or entity in a web page that can be authored by a user.

Also used herein, the term "plug-in" generally refers to at least one script configured to be executed by a web browser to provide a designed user experience in a web page. An example plug-in in a web page can include a document viewer that can display a preview of a word processing document in the web page. Plug-ins can be created, for example, by a publisher of a CMS, third parties of the CMS, or a party associated with an author of the web page. A plug-in can comprise plug-in data including properties and property values for the plug-in. A plug-in can also comprise a manifest containing and identifying property metadata for the plug-in. Also used herein, the term "client-side" generally refers to program codes that run as a script inside a web page on a web browser executing on a client device. By contrast, "server-side" code runs on a web server in, for example, a datacenter belonging to a cloud service provider.

Figure 1A:
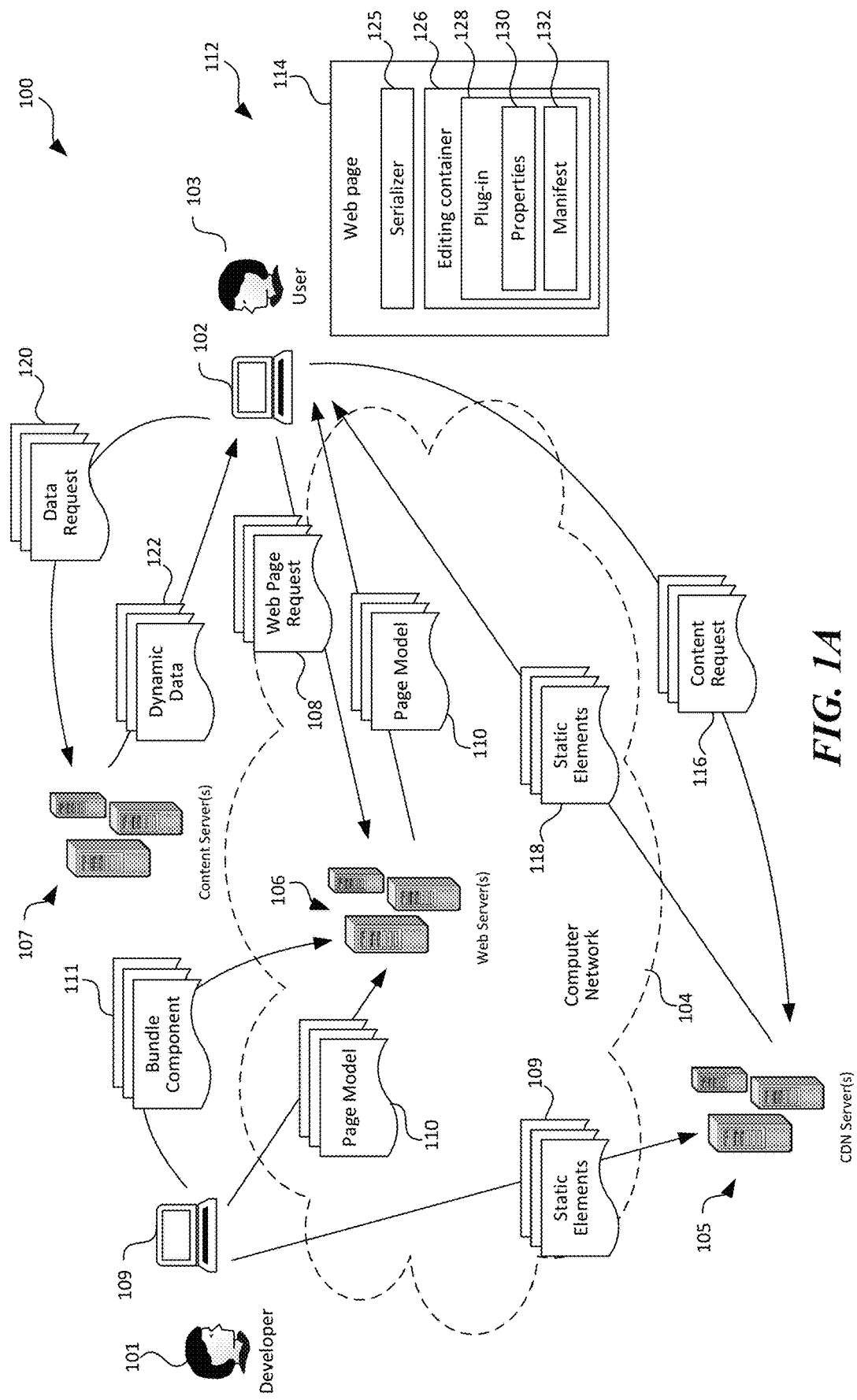
FIGS. 1A-1C are schematic diagrams illustrating a computing system implementing a serializer for serializing a web page in a first format including plug-in data of a second format in accordance with embodiments of the present technology.
Figure 1B:
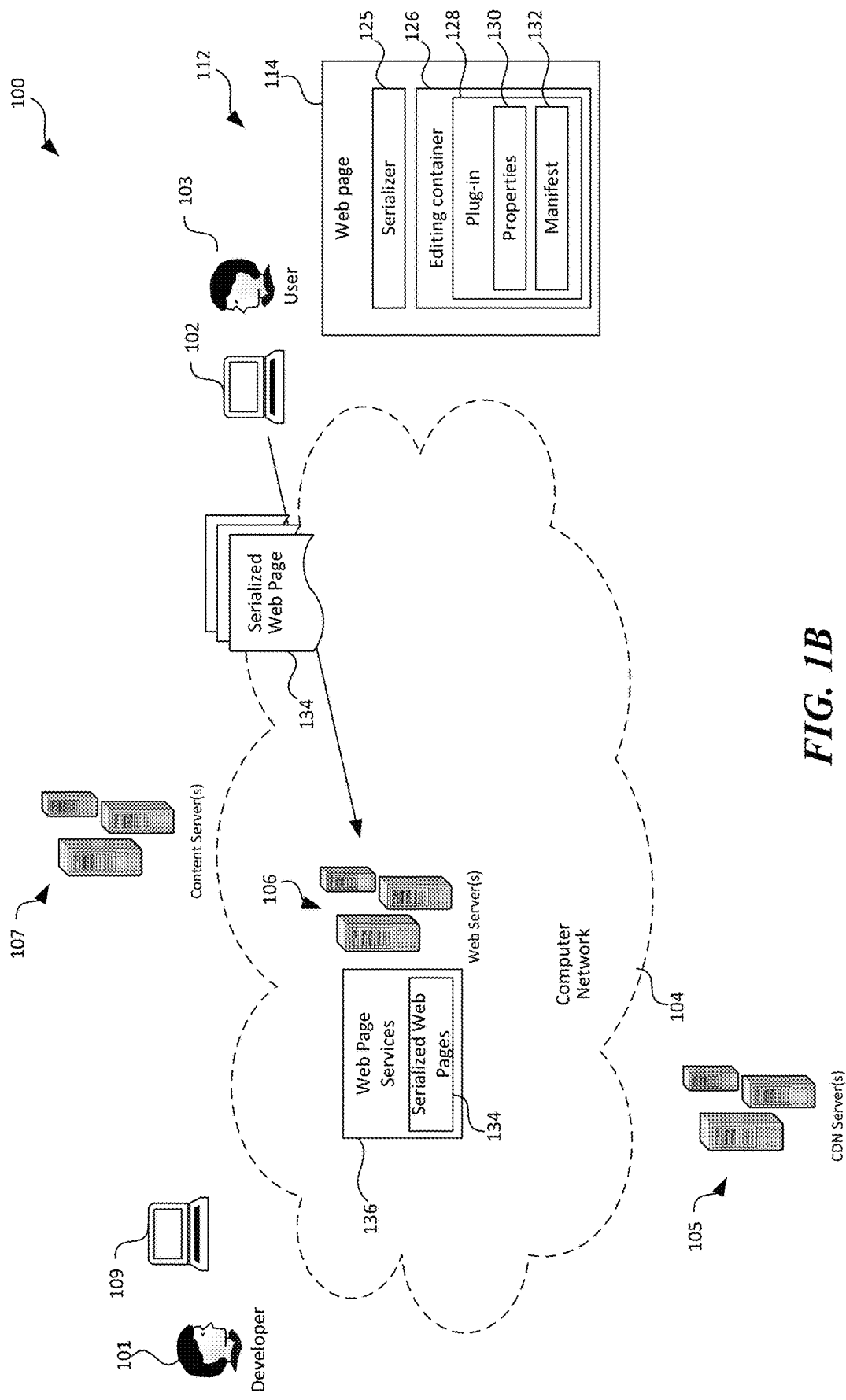
Figure 1C:
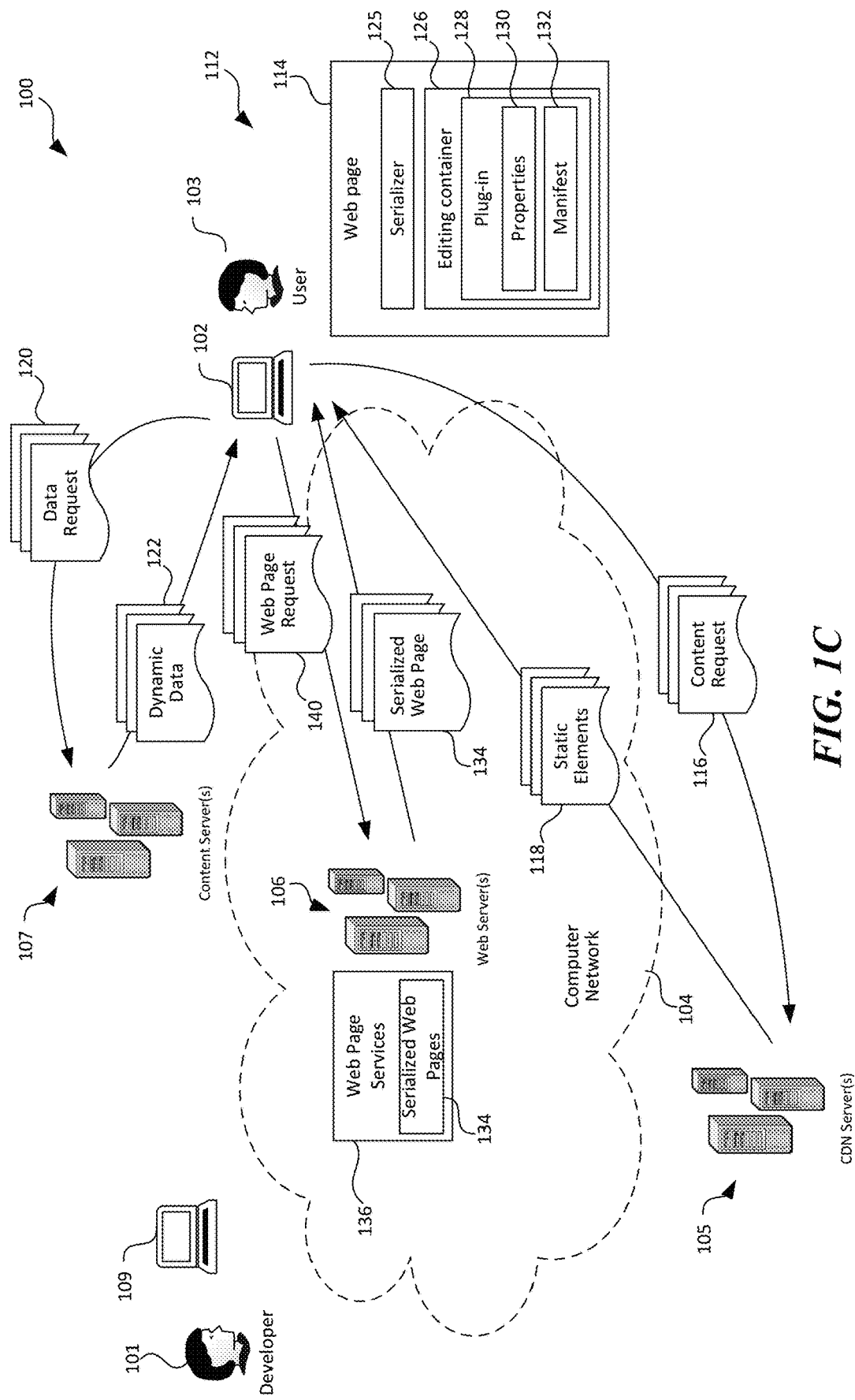

FIGS. 1A-1C are schematic diagrams illustrating a computing system 100 in accordance with embodiments of the present technology. As shown in FIG. 1A, the computing system 100 can include one or more web servers 106, client devices 102, content servers 107, content distribution network ("CDN") servers 105 interconnected by a computer network 104. In certain embodiments, the computer network 104 can include an intranet, an internet (e.g., the Internet), or other suitable types of computer network. The client devices 102 can include desktop, laptop, tablet, or other suitable types of computing devices. The web servers 106, the content servers 107, and the CDN servers 105 can individually include a server, a cluster of servers, or other suitable computing devices.

As shown in FIG. 1A, a developer 101 can create a page model 110 of a web application by using the client device 102. The page model 110 can include a URL or other suitable types of references to a bootloader script, which can include script modules, execution of which can cause a web browser to render a web page object, retrieve information from content servers via a computer network 104, or perform other suitable actions. The bootloader script can be configured to include a loader and embedded bundle components. The embedded bundle components can comprise bundle components that are to be available immediately to the web page upon receiving the page model 110, thereby avoiding separate network operations for obtaining the bundle components. The page model 110 can then be saved in the web servers 106. The developer 101 can also save copies of static elements such as images, texts, etc. in one or more CDN servers 105, for ready distribution.

Upon receiving a web page request 108 from the user 103 via the computer network, the web servers 106 can provide the page model 110 to the client device 102 instead of a fully or partially rendered web page. The page model 110 can include a data structure that describes information needed to render a web page 114. Data contained in the page model 110 can be different for each web page 114, while the same bootloader script may be used to render multiple different web pages 114. In certain implementations, data of the page model 110 can be embedded in a visually blank web page 110 that is generated by the web server 106. The bootloader script referenced in the page model 110 can be retrievable from the CDN servers 105, the web server 106, or other suitable sources. Upon receiving the page model 110, in certain embodiments, a web browser 112 on the client device 102 can execute the bootloader script referenced in the page model 110 to render a web page 114. For example, the web page 114 can execute the bootloader script to generate a content request 116 for retrieving various static elements 118 from the CDN servers 105. The web page 114 can also transmit a data request 120 to content servers 107 for retrieving dynamic data 122 from the content server 107. Both the static elements 118 and the dynamic data 122 can then be rendered on web page 114 at the client device 102. In other embodiments, the web browser 112 can request and retrieve the static elements 118 from other suitable sources.

In some embodiments, the web servers 106 can be configured as a content management server ("CMS"), which can host a customizable database for storing web sites, document libraries, web pages, and other content. The CMS enables web pages 114 to be created by the user 103 or other suitable entities. As the author, the user 103 can be an information worker who works directly within the web browser to compose text, graphic, etc., and design visual appearances of the web page 114. Content can include, for example, a page that shows a company news portal, including a business calendar for the company. The user 103 can also add third party plug-ins to the web page 114. Examples of CMS products include WordPress, Drupal, and SharePoint®.

After the user 103 edits the web page 114, the web page 114 can receive an user's selection of an option to save the web page 114 with the edits. In some embodiments, a property data of a plug-in instance, which can be provided by the author, is saved into a database (e.g., a Structured Query Language ("SQL") database) alongside the web page data. In certain embodiments, the web pages 114 can be saved as HTML files or in other suitable manners. In other embodiments, web pages 114 can be stored in a CMS system as a collection of page data fields in a database record. When another user 103 views the web page 114, the CMS system can use the stored data associated with the web pages 114 and the page model 110 to render the HTML output that constitutes the web page 114 as presented by the web browser 112. This runtime rendering has many advantages.

For example, if a page template is redesigned, or if a navigation menu is improved, every existing page can automatically reflect these changes.

Several embodiments of the disclosed technology are directed to serializing the web page 114 comprising a plug-in that is in a different format from that of the web page 114. In particular, data for the plug-in can be incorporated in the format of the web page 114 for saving. As shown in FIG. 1A, the web page 114 can include a serializer 125 and an editing container 126 that includes a plug-in 128. The plug-in 128 can comprise properties 130 and a manifest 132. The editing container 126 may comprise a portion of the web page 114 that can be modified by the user 103. For example, the editing container 126 may comprise an editing surface including a toolbox comprising options for allowing a user 103 to enter text in the editing container 126, link documents, or insert the plug-in 128. In some embodiments, a plug-in 128 is included in the web page 114 outside of the editing container 126. In some embodiments, the web page 114 includes multiple plug-ins 128, and data for each can be serialized in the serialized web page 114.

The plug-in 128 can comprise client-side scripts for providing a designed user experience in the web page 114. The plug-in 128 can render HTML, cascading style sheets ("CSS"), JavaScript, or the like, in the web page 114 by the web browser 112. The plug-in 128 includes properties 130 that can be defined by a developer 101 of the plug-in 128. In some embodiments, the properties can be formatted, for example, in JSON format. In some embodiments, the plug-in 128 includes default plug-in properties, such as a title of the plug-in. In some embodiments, the plug-in 128 includes a property specific to the plug-in 128. For example, the plug-in 128 may be configured to show a preview of a word processing document, and a property of the plug-in 128 can include a page number of the word processing document to show in the preview.

The plug-in 128 can include an associated manifest 132. The manifest 132 may comprise a list of properties of the properties 130 of the plug-in 128 for serializing in the web page 114 when the web page 114 is saved. The manifest 132 can also comprise metadata associated with the properties 130. In some embodiments, metadata includes, for example, that a property value comprises HTML text, searchable text, a hyperlink URL, or a hyperlink URL for an image. In some embodiments, the manifest 132 comprises a default list of properties and default metadata, as defined by the developer 101 of the plug-in 128. In some embodiments, the manifest 132 includes a list of properties and metadata defined by an administrator (not shown) of the web page 114, including, for example, the user 103.

The web page 114 can be configured to receive modifications to the web page 114 by the user 103, and to receive an instruction from the user 103 to save the web page 114. The serializer 125 can be configured to serialize and save the web page 114. As shown in FIG. 1B, the user device 102 can then transmit the serialized web page 134 to the web servers 106 for storage. Although the serializer 125 is depicted in FIGS. 1A-1C as a distinct module from the editing container 126 and the plug-in 128, the serializer 125 can be configured as part of the editing container 126 and/or the plug-in 128 in some implementations.

The serializer 125 can be configured to serialize the web page 114, including the content of the editing container 126, to generate the serialized web page 134. The editing container 126 can include rich text, graphics, plug-ins, and so forth, as submitted by the user 103 via the web page 114. The serializer 125 can be configured to serialize the editing container 126 in a format of the web page 134, such as HTML. For example, rich text submitted by the user 103 in a text field in the web page 114 can be added in the body of an HTML document representing the serialized web page 134.

The serializer 125 can be configured to serialize the plug-in 128, including by formatting at least some data of the plug-in 128 in the format of the web page 134 and incorporating the formatted data therein. In some embodiments, the formatted data can comprise a property, an associated property value, and associated metadata. The serializer 125 can be configured to identify the property, associated property value, and associated metadata using the manifest 132. The manifest 132 can include a reference to a property from the plug-in properties 130 and metadata associated with the property. The serializer 125 can be configured to copy a value for the property from the plug-in properties 130, format the property value and associated metadata according to the format of the serialized web page 134, and add the formatted property value and associated metadata in the serialized web page 134. For instance, if a value for the property from the plug-in 128 is text comprising an annotation for the plug-in 128, and the serialized web page 134 is formatted in HTML, the serializer 125 can be configured to generate HTML code comprising the annotation text and add the generated HTML code to the serialized web page 134. In some embodiments, the serializer 125 can be configured to add the annotation text and associated metadata to a predetermined HTML attribute in the serialized web page 134. The metadata can comprise, for example, that the annotation text is searchable.

The serializer 125 can also be configured to serialize plug-in properties 130 that are not formatted into the format of the web page 134. For example, run-time properties for the plug-in 128 can be formatted in JSON, and the serializer 125 can be configured to add the JSON-formatted properties and associated values to the web page 114 in a predetermined attribute. In some embodiments, the serializer 125 can be configured to serialize, in the format of the plug-in properties 130, only the properties not already included in the serialized web page 134 in the format of the web page 134. For example, if an annotation property of the plug-in 128 is included in the manifest 132 and incorporated in the serialized web page 134 in the format of the web page 134, the serializer 125 can be configured to refrain from adding the annotation property in the format for the plug-in properties 130.

The web page services 136 of the web server 106 can receive and store the serialized web page 134. The web page services 136 can maintain the stored serialized web pages 134 that correspond to different web pages of a web site. In some embodiments, the web page services 136 can be configured to perform various services on stored web pages 134, including integrating web pages 134 in search, incorporating web pages 134 in search relevance computations, scrubbing the web pages 134 for security vulnerabilities, fixing broken links in the web pages 134, optimizing loading of components of the web pages 134, such as the rendering of images, and so forth.

The web page services 136 can be configured to provide the serialized web page 134 when requested by the web browser 112 of the device 102. As shown in FIG. 1C, the web browser 112 of the user device 102 can transmit a web page request 140 to the web servers 106. The web page services 136 can be configured to identify a serialized web page 134 based on the web page request 140, and transmit the identified serialized web page 134 to the web browser 112 of the user device 102.

The serializer 125 can be configured to de-serialize the serialized web page 134 for rendering the web page 114. In some embodiments, the serialized web page 134 is provided by the web servers 106 as a page model 110. The serializer 125 can be launched when the page model 110 is loaded by the web browser 112. In some embodiments, the serializer 125 can be configured to extract properties of the plug-in 128 that were included in the serialized web page 134 in the format of the plug-in (e.g., JSON). The serializer 125 can also be configured to identify the properties of the plug-in 128 formatted in the format of the serialized web page 134 (e.g., HTML), and to extract the properties the associated values.

The serializer 125 can be configured to then reconstruct the properties associated with the plug-in 128 using the properties for the plug-in 128 extracted from the serialized web page 134. The serializer 125 can be configured to provide the reconstructed property values to the plug-in 128. The serializer 125 can also de-serialize other web page content, such as body text and titles, and the web page, including the plug-in 128, can be rendered as saved by the user 103 previously. For example, the web page 114 can execute scripts to generate a content request 116 for retrieving various static elements 118 from the CDN servers 105. The web page 114 can also transmit a data request 120 to content servers 107 for retrieving dynamic data 122 from the content server 107, in order to render the web page 114.

One benefit of the disclosed technology is that the web page services 136 can perform CMS services on data associated with plug-ins 128 that are included in a web page 114 even though the plug-ins 128 are in a format not understandable by the CMS. Accordingly, for example, the annotation associated with the plug-in 128 in the example above can be crawled by a search engine of the CMS. The disclosed technology thus enables these CMS services without any changes to the plug-ins 128. Furthermore, de-serializing the web page 114 does not rely on the manifest 132 used for serializing the web page 114. Accordingly, the serializer 125 can load data that was saved by an older version of the plug-in 128, whose manifest 132 would generally not be available to the serializer 125, and whose metadata may have contained different instructions.

Figure 2:
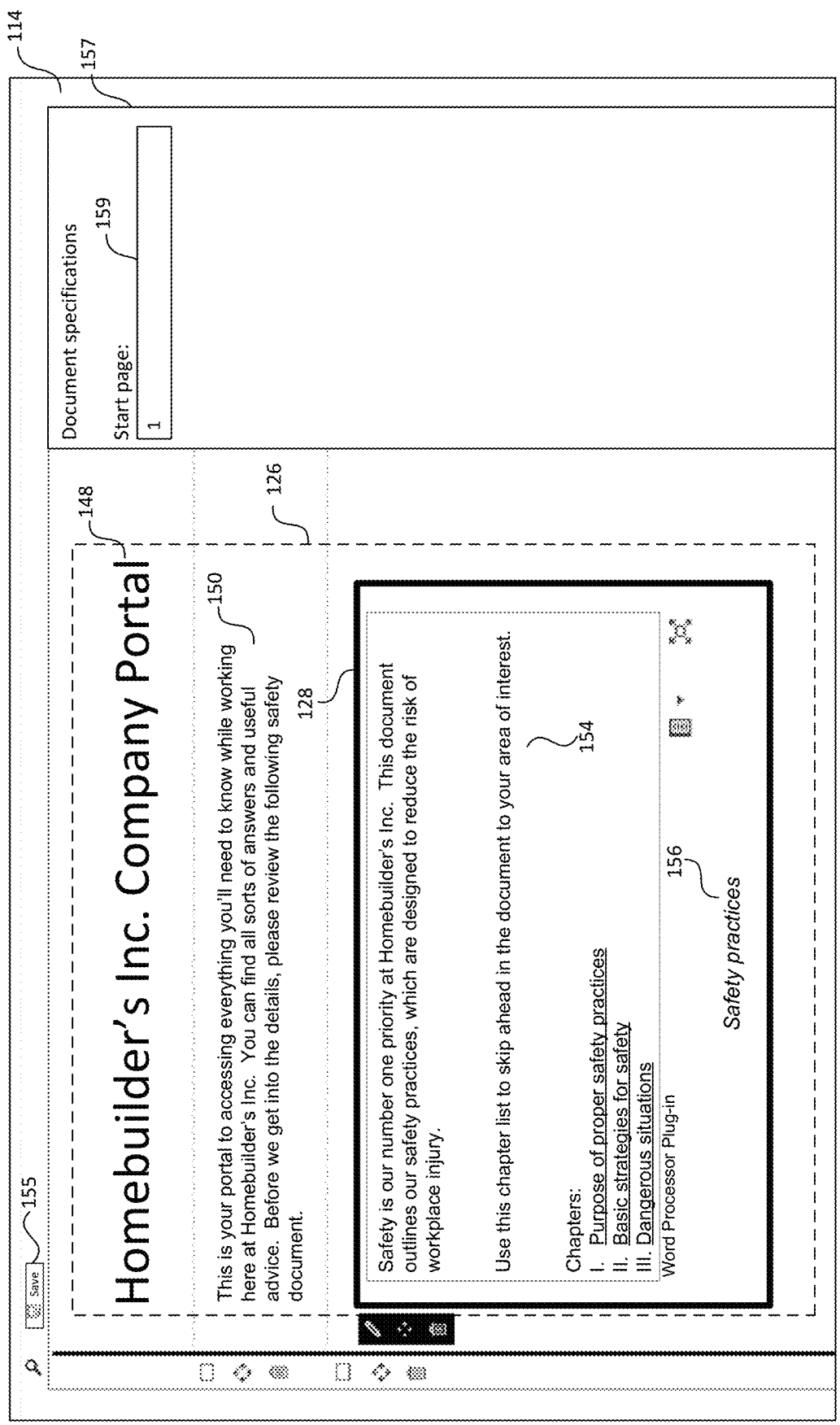
FIG. 2 is an example user interface for a web page being authored by a user in accordance with embodiments of the disclosed technology.

FIG. 2 shows an example graphical user interface of the webpage 114 in an "edit mode," as generated by the web browser 112 (FIG. 1) of the client device 102 for editing the web page 114. The web page 114 can include the editing container 126, which includes the plug-in 128. In the example of FIG. 2, the plug-in 128 comprises a word processor plug-in, that can display a preview of a word processing document 154. The plug-in 128 includes a caption 156, which reads "Safety practices." The editing container 126 also includes rich text 150 and a title 148, submitted in text input zones of the web page 114.

The web page 114 includes a document specifications pane 157, which can be configured to receive user input with respect to a property of the plug-in 128. For example, the document specifications pane 157 includes a field 159 for receiving user input for a start page property of the plug-in 128. In the depicted example, the start page property can identify a page of the document 154 for displaying initially in the preview of the document in the plug-in. The web page can include a save button 155, for receiving a request to save the web page 114 after changes have been made to the web page 114.

FIG. 3 is a text file comprising example plug-in 128 run-time properties 130. The run-time properties 130 are in JSON format. Among the properties are an annotation property 164, a serverRelativeUrl property 168, a title property 170, and a wdstarton property 171. The annotation property includes the value "Safety practices," corresponding to the caption 156 of FIG. 2. The wdstarton property 171 includes a value of "1", corresponding to the value received in the field 159 for a start page property of the plug-in 128, as in FIG. 2.

Figure 4:
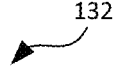
FIG. 4 is a text file including example manifest data for a plug-in in accordance with embodiments of the disclosed technology.

FIG. 4 is an example text file including the manifest 132 associated with the plug-in 128. The manifest 132 includes a listing of properties, including the annotation property 164, the title property 170, and the serverRelativeUrl property 168, and metadata associated with those properties. For example, annotation metadata 176 includes that the annotation property is searchable plaintext. In some embodiments, a plug-in includes a default manifest comprising a list of default properties and default metadata associated with the properties, and the default manifest is associated with the plug-in when the plug-in is added to the web page 114. In some embodiments, the manifest can be modified by an administrator of the web page 114, including, for example, the user 103.

FIG. 5A is an example text file comprising the serialized web page 134. The serialized web page 134 shown in FIG. 5A comprises HTML defining the editing container 128 of the web page 114. In some embodiments, the serialized web page 134 can comprise code for defining the entire web page including web page objects outside the editing container 128, such as a navigation bar, site logo, and so forth. The serialized web page 134 includes the title 148 and the rich text 150 received from the user 103 in the text input zones of the web page 114. The serialized web page 134 also includes the annotation property 164, the value of the annotation property, "Safety practices", and the annotation metadata 176, all included in an HTML attribute, "data-sp-prop-name". The serverRelativeUrl property 168 is included in the serialized web page 134 in association with the URL, "/personal/johndoe_microsoft_com/Documents/Document.docx" in a similar HTML attribute.

The serialized web page 134 includes reduced properties 184, as shown in FIG. 5B. The reduced properties 184 do not include the annotation property 164 or the serverRelativeUrl property 168, which are included in HTML format in the serialized web page 134. The reduced properties 184 are included in JSON format in the serialized web page 134.

Figure 6A:
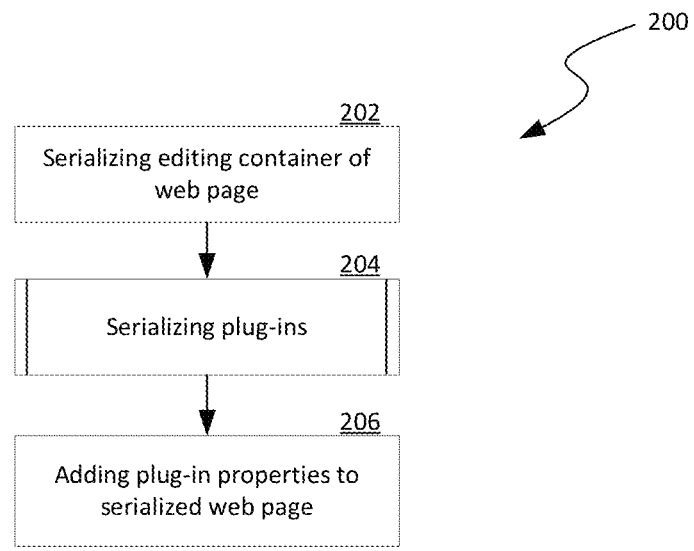
FIGS. 6A-6B are flowcharts illustrating a process for serializing a web page in accordance with embodiments of the disclosed technology.
Figure 6B:
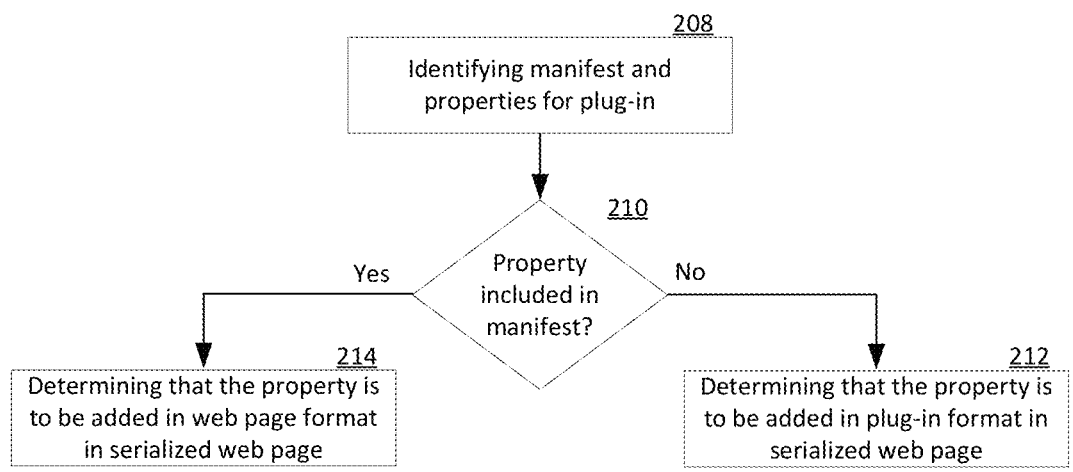

FIGS. 6A-6B are flowcharts illustrating various processes of serializing a web page that includes a plug-in whose data are a different format from the web page format, such that services performed, for example, by a CMS, can be performed using the plug-in data. Even though various embodiments of the processes are described below with reference to the computing system 100 of FIG. 1, in other embodiments, the processes can also be performed with other suitable types of computing frameworks, systems, components, or modules.

As shown in FIG. 6A, a process 200 includes serializing an editing container of a web page at stage 202. The editing container can be serialized in response to receiving from a user a request to save the web page. Serializing the editing container can comprise adding received user input, such as rich text input in a text field, to the serialized web page in a format of the serialized web page, such as HTML.

The process 200 can include serializing plug-in data at stage 204. Serializing plug-in data is described in more detail below with respect to FIG. 6B. As discussed below, serializing plug-in data can include determining properties, property values, and metadata to add to the serialized web page in a format of the web page, and identifying properties and property values to add to the serialized web page in a format of the plug-in data. The process 200 includes adding plug-in properties to the serialized web page at stage 206. Adding plug-in properties to the serialized web page includes adding properties, property values, and metadata to the serialized web page, that have been determined to be added in a format of the web page. In some embodiments, adding the properties, property values, and metadata to the serialized web page in the format of the web page includes adding this data inside special HTML attributes in the web page. Adding plug-in properties to the serialized web page can also include adding properties and property values to the serialized web page in the format of the plug-in data, such as in JSON.

As shown in FIG. 6B, the operations can include identifying a manifest and run-time properties for the plug-in at stage 208. Decision stage 210 includes determining whether a property is included in the manifest. In some embodiments, the manifest includes a listing of properties that are to be formatted in the format of the web page for serializing in the serialized web page. When the property is not included in the manifest, the operations include determining that the property is to be added in plug-in data format in the serialized web page at stage 212. When the property is included in the manifest, the operations include determining that the property is to be added in web page format in the serialized web page. Determining that the property is to be added in web page format in the serialized web page can include determining that the property value and property metadata are to be added in web page format in the serialized web page. Stages 210-214 can be performed for each property associated with the plug-in, such that properties included in the manifest are determined to be added to the serialized web page in the web page format.

Figure 7:
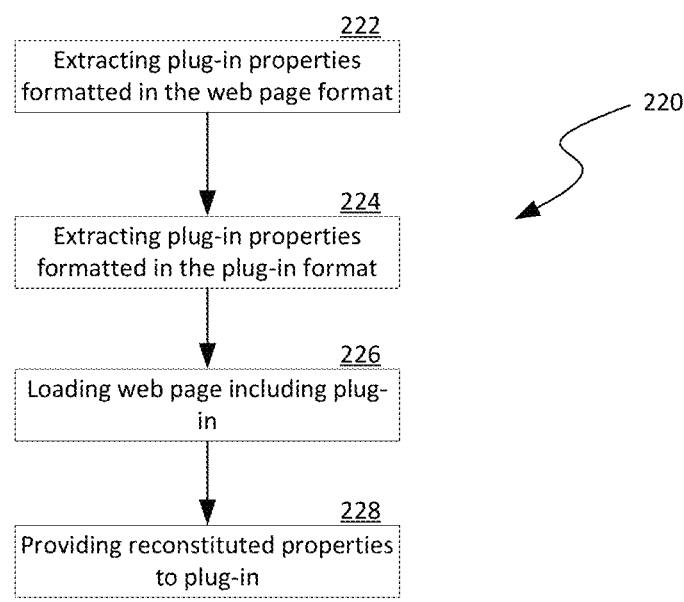
FIG. 7 is a flowchart illustrating a process for de-serializing a serialized web page in accordance with embodiments of the disclosed technology.

FIG. 7 is a flowchart illustrating various processes of de-serializing a serialized web page that includes a plug-in including properties that are in a different format from the web page format. Even though various embodiments of the processes are described below with reference to the computing system 100 of FIG. 1, in other embodiments, the processes can also be performed with other suitable types of computing frameworks, systems, components, or modules.

As shown in FIG. 7, a process 220 includes extracting plug-in properties formatted in the web page format from the serialized web page at stage 222. Extracting plug-in properties can include extracting property and property values formatted in the format of the web page, such as HTML. The process 200 can include extracting plug-in properties formatted in the plug-in data format at stage 224. Extracting plug-in properties formatted in the plug-in format can include identifying properties and property values for the plug-in in the serialized web page, which are formatted, for example, in JSON. The process 200 can include loading the web page and the plug-in at stage 226. The process can include providing the reconstituted properties to the plug-in at stage 228. The plug-in can process the reconstituted properties and the web page, including the plug-in, can be rendered as it was originally saved.

Figure 8:
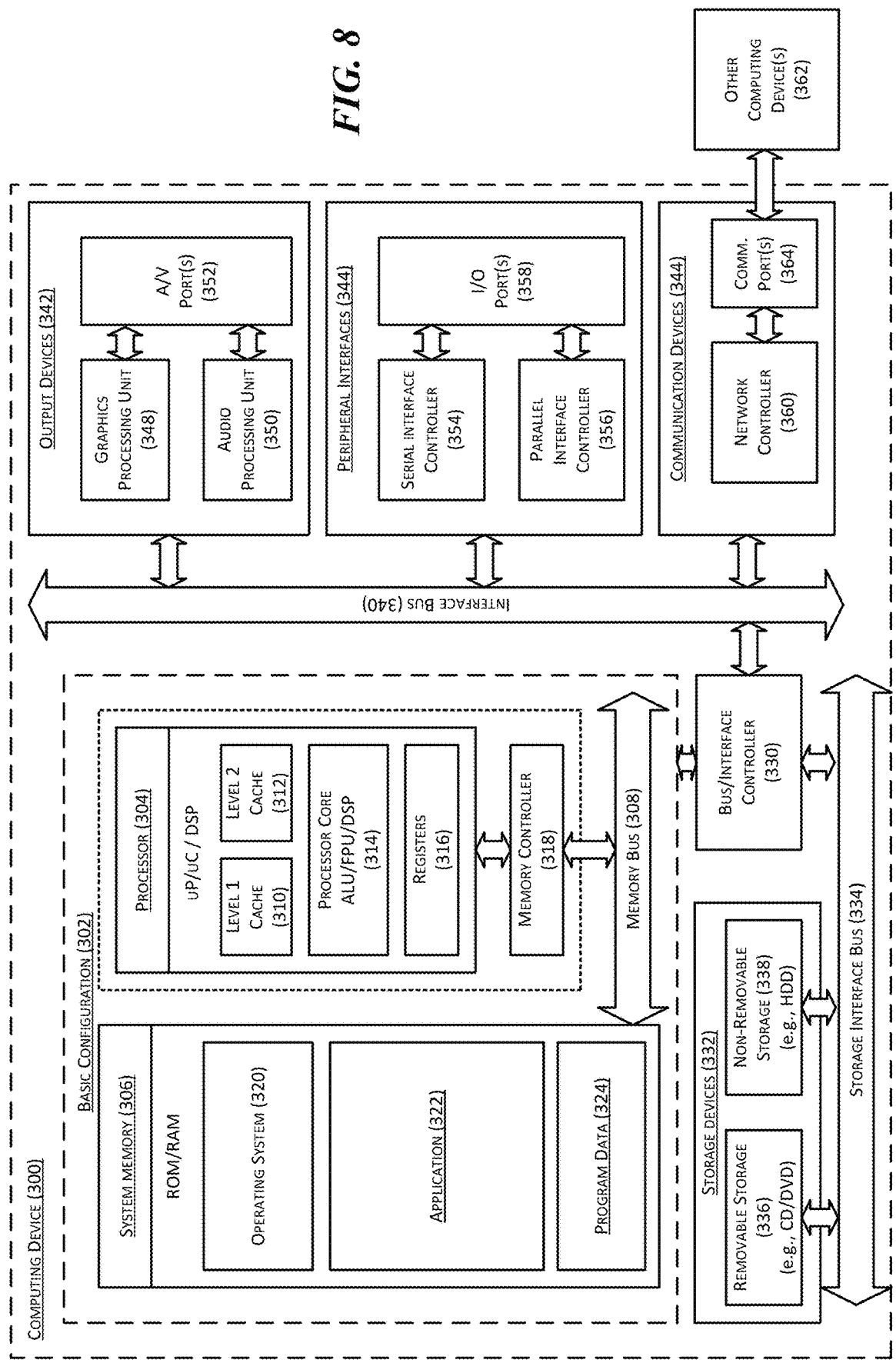
FIG. 8 is a computing device suitable for certain components of the computing system in FIG. 1.

FIG. 8 is a computing device 300 suitable for certain components of the computing system 100 in FIG. 1. For example, the computing device 300 can be suitable for the web servers 106, the CDN server 105, the content server 107, or the client devices 102 of FIG. 1. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (µP), a microcontroller (µC), a digital signal processor (DSP), or any combination thereof. The processor 304 can include one more levels of caching, such as a level-one cache 310 and a level-two cache 312, a processor core 314, and registers 316. An example processor core 314 can include an arithmetic logic unit (ALU), a floating point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. This described basic configuration 302 is illustrated in FIG. 7 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

From the foregoing, it will be appreciated that specific embodiments of the disclosure have been described herein for purposes of illustration, but that various modifications can be made without deviating from the disclosure. In addition, many of the elements of one embodiment can be combined with other embodiments in addition to or in lieu of the elements of the other embodiments. Accordingly, the technology is not limited except as by the appended claims.

We claim:

1. A method of serializing a web page being edited at a client device for storage, comprising:
   outputting, at the client device, an editing user interface configured to facilitate editing of the webpage having a plug-in of at least one script configured to be executed by a web browser to provide a designed user experience in the web page, the webpage having multiple webpage components in a first format and the plug-in including multiple configuration properties of the at least one script and is in a second format different than the first format of the webpage, wherein the multiple configuration properties individually include a property value corresponding to an execution configuration of the at least one script of the plug-in;
   receiving, via the outputted editing user interface, a user input to edit the webpage, the user input representing a new value to one of the multiple configuration properties of the at least one script of the plug-in on the webpage, wherein the new value modifies an execution configuration of the at least one script of the plug-in corresponding to the one of the configuration properties; and upon receiving an additional user input to serialize the edited web page for storage,
identifying a subset of the configuration properties of the at least one script of the plug-in for inclusion in the serialized web page according to a manifest of the plug-in; and
for each configuration property in the identified subset of the configuration properties:
copying, from the each configuration property in the identified subset of the configuration properties, a property value corresponding to the each configuration property of the at least one script of the plug-in into a data object to be included in the serialized webpage;
formatting the data object having the copied property value according to the first format of the webpage; and
serializing the web page by adding the formatted data object having the copied property value of the property of the at least one script of the plug-in to the serialized web page.

2. The method of claim 1 further comprising, for each configuration property:
identifying metadata for each configuration property;
formatting the metadata in the first format; and
adding the formatted metadata to the serialized web page in association with the formatted data object having the copied property value.

3. The method of claim 1 further comprising, for each configuration property:
identifying metadata for the each configuration property, the metadata including a type of the configuration property; and
formatting the metadata including the type of the configuration property in the first format, wherein serializing the web page further includes adding the formatted metadata to the serialized web page.

4. The method of claim 3, wherein the type of the configuration property included in the metadata includes one of HTML, text, searchable text, a hyperlink to a web page, and a hyperlink for an image.

5. The method of claim 1 wherein serializing the web page further comprises:
for another subset of the configuration properties of the plug-in not included in the identified sub set of the configuration properties,
adding the another subset of the configuration properties and associated property values to the serialized web page in the second format.

6. The method of claim 1 wherein:
the manifest includes the subset of the configuration properties of the plug-in for inclusion in the serialized web page in the first format.

7. The method of claim 1 wherein:
the first format is HTML and the second format is JavaScript Object Notation (JSON).

8. The method of claim 1 wherein:
the editing user interface includes content received from a user of the webpage authoring the webpage,
serializing the web page comprises serializing the editing user interface and adding the serialized editing user interface to the serialized web page.

9. The method of claim 1 wherein:
formatting data object having the copied property value in the first format includes adding the property value and the property to an HTML attribute of the serialized web page.

10. The method of claim 1 further comprising transmitting the serialized web page to a cloud server for storage.

11. A computing device, comprising:
a processor; and
a memory containing instructions executable by the processor to cause the computing device to:
output, at the client device, an editing user interface configured to facilitate editing of a webpage having a plug-in embedded in the webpage, the webpage having multiple webpage objects in a first format and the plug-in including at least one script configured to be executed by a web browser to provide a designed user experience in the web page, wherein the plug-in includes multiple configuration properties of the at least one script and is in a second format different than the first format of the webpage, wherein the multiple configuration properties individually include a property value corresponding to an execution configuration of the at least one script of the plug-in;
receive, via the outputted editing user interface, a user input representing a new value to one of the configuration properties of the at least one script of the plug-in embedded in the webpage, the new value modifying an execution configuration of the at least one script of the plug-in corresponding to the one of the configuration properties; and
upon receiving an additional user input to serialize the web page in the first format for storage, generate the serialized web page in the first format by:
identifying a list of the configuration properties of the at least one script of the plug-in for adding to the serialized web page in the first format of the webpage according to a manifest of the plug-in; and
for each configuration property in the identified list of configuration properties:
copying, from the each configuration property, a property value corresponding to the each configuration property of the at least one script into a data object to be included in the serialize webpage;
formatting the data object having the copied property value according to the first format of the webpage; and
adding the formatted data object having the copied property value of the at least one script to the serialized web page in the first format.

12. The computing device of claim 11 wherein the memory contains further instructions executable by the processor to cause the computing device to:
for each configuration property in the identified list of plug-in properties:
identify metadata for the each configuration property;
format the metadata in the first format; and
add the formatted metadata to the serialized web page in association with the formatted data object having the copied property value.

13. The computing device of claim 11 wherein the memory contains further instructions executable by the processor to cause the computing device to:
for each of configuration property in the identified list of plug-in properties:
identify metadata for the each of configuration property, the metadata including a type of the each of configuration property, format the metadata in the first format, and
add the formatted metadata to the serialized web page.

14. The computing device of claim 13 wherein the type of the each of configuration property included in the metadata includes one of HTML, text, searchable text, a hyperlink to a web page, and a hyperlink for an image.

15. The computing device of claim 11 wherein the memory contains further instructions executable by the processor to cause the computing device to:
for another list of one or more configuration properties of the plug-in not included in the identified list of the plug-in properties,
add the another list of the one or more configuration properties and corresponding property values in the second format to the serialized web page.

16. The computing device of claim 11 wherein:
the first format is HTML and the second format is JavaScript Object Notation (JSON).

17. The computing device of claim 11 wherein:
the editing user interface includes content received from a user of the webpage authoring the webpage; and
the memory contains further instructions executable by the processor to cause the computing device to:
serialize the editing user interface, wherein:
the serialized web page comprises the serialized editing user interface, and
the formatted data object having the copied property value is added to the serialized editing user interface.

18. A non-transitory computer storage medium storing instructions executable by a processor of a computer to cause the computer to:
output, at the client device, an editing user interface configured to facilitate editing of a webpage having a plug-in embedded in the webpage, the webpage having multiple webpage objects in a first format and the plug-in including at least one script configured to be executed by a web browser to provide a designed user experience in the web page, wherein the plug-in includes multiple configuration properties of the at least one script and is in a second format different than the first format of the webpage, wherein the multiple configuration properties individually include a property value corresponding to an execution configuration of the at least one script of the plug-in;
receive, via the outputted editing user interface, a user input representing a new value to one of the configuration properties of the at least one script of the plug-in embedded in the webpage, the new value modifying an execution configuration of the at least one script of the plug-in corresponding to the one of the configuration properties; and
upon receiving an additional user input to serialize the web page in the first format for storage, generate the serialized web page in the first format by:
identifying a list of the configuration properties of the at least one script of the plug-in for adding to the serialized web page in the first format of the webpage according to a manifest of the plug-in; and
for each configuration property in the identified list of configuration properties:
copying, from the each configuration property, a property value corresponding to the each configuration property of the at least one script into a data object to be included in the serialize webpage;
formatting the data object having the copied property value according to the first format of the webpage; and
adding the formatted data object having the copied property value of the at least one script to the serialized web page in the first format.

19. The non-transitory computer storage medium of claim 18 further comprising additional instructions executable by the processor to cause the computer to:
for each configuration property in the identified list of plug-in properties:
identify metadata for the each configuration property;
format the metadata in the first format; and
add the formatted metadata to the serialized web page in association with the formatted data object having the copied property value.

20. The non-transitory computer storage medium of claim 18 further comprising additional instructions executable by the processor to cause the computer to:
for each of configuration property in the identified list of plug-in properties:
identify metadata for the each of configuration property, the metadata including a type of the each of configuration property,
format the metadata in the first format, and
add the formatted metadata to the serialized web page.

* * * * *